United States Patent [19]

Adaniya et al.

[11] Patent Number: 4,978,588
[45] Date of Patent: Dec. 18, 1990

[54] PLATED STEEL SHEET FOR A CAN

[75] Inventors: Takeshi Adaniya; Yoshinori Yomura; Naoyuki Ooniwa; Yoshihiko Yasue; Hiroshi Kagechika; Tadahiko Mishima; Hiroshi Ishikawa, all of Tokyo, Japan

[73] Assignee: NKK Corporation, Tokyo, Japan

[21] Appl. No.: 514,419

[22] Filed: Apr. 25, 1990

Related U.S. Application Data

[62] Division of Ser. No. 245,754, Sep. 16, 1988.

[30] Foreign Application Priority Data

Sep. 18, 1987 [JP] Japan .................................. 62-233975

[51] Int. Cl.$^5$ ...................... B32B 15/10; C23C 16/00; B65D 90/04
[52] U.S. Cl. ................................ 204/192.31; 428/650; 428/653; 428/659; 428/660; 428/648; 428/938; 427/250; 427/405; 427/255.7; 220/456
[58] Field of Search .............. 428/653, 659, 648, 660, 428/938; 204/192.31; 427/250, 405, 255.7; 220/456

[56] References Cited

U.S. PATENT DOCUMENTS

| | | | |
|---|---|---|---|
| 2,887,406 | 5/1959 | Homer | 428/660 |
| 3,415,672 | 12/1968 | Levinstein et al. | 428/653 |
| 3,615,902 | 10/1971 | Lesney | 428/660 |
| 3,854,891 | 12/1974 | Chivinsky | 428/660 |
| 4,624,895 | 11/1986 | Nickola | 428/653 |
| 4,897,316 | 1/1990 | Kagechika et al. | 428/653 |

*Primary Examiner*—R. Dean
*Assistant Examiner*—Robert R. Koehler
*Attorney, Agent, or Firm*—Frishauf, Holtz, Goodman & Woodward

[57] ABSTRACT

The invention provides a method for producing a coated steel sheet for a can. A film of aluminum, aluminum alloy, titanium or titanium alloy 0.005 to 5 μm thick is plated on one surface of a steel sheet by means of a dry process. A metal film is also plated on the other surface of the steel sheet by means of a dry process.

4 Claims, No Drawings

PLATED STEEL SHEET FOR A CAN

This is a division of application Ser. No. 07/245,754 filed Sept. 16, 1988, now U.S. Pat. No. 4,940,638.

BACKGROUND OF THE INVENTION

1. Field of the Invention

The present invention relates to a plated steel sheet for a can, and more particularly to plated metals.

2. Description of the Prior Art

A tinplace made by applying tin on a steel sheet electrolytically, tin free steel made by applying chromium or nickel on a steel sheet electrolytically or aluminium sheet and the like have been hitherto used for materials for a food can and a drink can. Among those materials, surface treated steel sheets show enough strength for can use although they are thin. In recent years, there has been often used a convenient can which has so-called easy-open end which can be opened by hand without using any can-opener. The aluminium sheet has characteristic of an easiness of forming easy-open ends.

A body of the can is made of surface treated steel sheet and an end of the can is made of aluminium sheet with the use of the above-mentioned characteristics. However, in case the body and the end of the can are made of different metals respectively, there occurs what is called a bi-metallic corrosion wherein either of those metals dissolves preferentially and corrodes. This bi-metallic corrosion hinders the spread of the convenient can.

The bi-metallic corrosion is a phenomenon that, when metals with different electrode potentials are electrically connected with each other in an electrolyte, electric current flows from a noble metal to the base metal in potential and the base metal ionizes and begins to dissolve. For example, in case a body of a can is made of tinplate and an end of the can of aluminium, the standard potential of aluminium is $-1.66$ v and that of tin is $-0.14$ v. In this case, tin is more noble than aluminium. Therefore, an anodic reaction (1) occurs on the surface of the aluminium sheet and aluminum dissolves. At the same time, a cathodic reaction (2) occurs on the surface of the tinplate and hydrogen is produced.

$$Al \rightarrow Al^{3+} + 3e \quad (1)$$

$$3H^+ + 3e \rightarrow 3/2 H_2 \uparrow \quad (2)$$

The above-mentioned reaction does not occur on the whole inner surface of the can because the inner surface of the aluminium end and the tinplate body of the can is usually lacquered. On the side of aluminium, the above-mentioned reaction occurs concentratedly on a defect of a lacquer film. When the reaction proceeds, a hole is made in the aluminium end. On the side of tinplate, produced hydrogen raises the lacquer films causes a blister. If this reaction proceeds, the lacquer films are peeled from the tinplate. This phenomenon occurs very remarkably when chloride ion participates in the reactions.

The reactions are explained above with specific reference to an example of aluminium and tin. However, there is quite a small difference of the case of tin free steel made by applying chromium of nickel on steel electrolytically from the case of tinplate made by applying tin on steel electrolytically. Even if the body of the can is made from aluminium alloy, the same phenomenon can occur in case of a existence of the difference in potential between the end and the body of the can. To overcome these difficulties, the following measures have been taken conventionally.

Firstly, there has been made an attempt to cover carefully the aluminium end with lacquer. This is an attempt to prevent a formation of a call by thickening the lacquer. However, there remain unsolved problems that corrosions are concentrated on the defects of the lacquer films and, therefore, a hole is liable to be made in the aluminium end, and that it is uneconomical to expend much memory for coating the end of the can.

Subsequently, it has been thought to make the potentials of the aluminium end nobler as disclosed in "ANTI-CORROSION" November 1986, p. 4. To accomplish such an object, an attempt has been made to produce an alloy by adding other metal such as copper to aluminium. In this case, the difference in potential between the end and the body of the can needs to be very small and corrosion resistance of the end should be good. A satisfactory alloy, however, has not yet been able to be obtained.

SUMMARY OF THE INVENTION

It is an object of the present invention to provide a surface treated steel sheet with high corrosion resistance in which bi-metallic corrosion does not occur.

To accomplish the above-mentioned object, the present invention provides plated steel sheet for a can as described below:

Plated steel sheet for a can comprising:
a steel sheet;
an Al plated film of 0.005 to 5 μm in thickness on one surface of said steel sheet; and
a plated film of 0.005 to 5 μm in thickness on the other surface of said steel sheet, the plated film comprising a metal selected from the group consisting of Al, Ti, Zn, Ni, Co, Cr, Mo and Sn;

Plated steel sheet for a can comprising:
a steel sheet;
an Al alloy plated film of 0.005 to 5 μm in thickness on one surface of the steel sheet; and
a plated coating of 0.005 to 5 μm in thickness on the other surface of said steel sheet, the plated film comprising a metal selected from the group consisting of Al, Ti, Zn, Ni, Co, Cr, Mo and Sn;

Plated steel sheet for a can comprising:
a steel sheet; a Ti plated film of 0.005 to 5 μm in thickness on one surface of the steel sheet; and
a plated film of 0.005 to 5 μm in thickness on the other surface of said steel sheet, the plated film comprising a metal selected from the group consisting of Al, Ti, Zn, Ni, Co, Cr, Mo and Sn;

Plated steel sheet for a can comprising:
a steel sheet;
a Ti alloy plated film of 0.005 to 5 μm in thickness on one surface of said steel sheet, and
a plated film of 0.005 to 5 μm in thickness on the other surface of said steel sheet, the plated film comprising a metal selected from the group consisting of Al, Ti, Zn, Ni, Co, Cr, Mo and Sn.

DESCRIPTION OF THE PREFERRED EMBODIMENT

When an attempt is made to make the potential of an aluminium end of a can nobler, the selection of materials is greatly limited and this makes it difficult to manufacture an appropriate alloy. However, it is comparatively easy to make base a potential on the surface of a surface treated steel sheet of a can body to meet the potential of the aluminium end. Thereby, it is possible to prevent bi-metallic corrosion. The present invention is made from this viewpoint.

Firstly, a steel sheet having an Al plated film has the same potential as the end. Further, if the plated film has a potential close to the potential of Al, the corrosion current becomes extremely small, even though a cell is formed between the plated film of the body and the aluminium end. Ti is regarded as a metal which forms such a film and does not inflict any injury upon the human body.

The standard electrode potential of Ti is $-1.63$ v which is very close to the standard potential of Al. Ti is also a metal of high corrosion resistance and high workability. From the above-mentioned, bi-metallic corrosion can be prevented by applying Al plated or Ti plated surface of steel sheet to the inner surface of a can.

A plated film of 0.005 $\mu$m or more in thickness is required. When the thickness of the plated film is less than 0.005 $\mu$m, the coverage of film becomes insufficient. The thicker the plated film is, the higher the corrosion resistance is. However, the plated film of 5 $\mu$m in thickness is sufficient. An excessively thick plated film can produce a crack in the plated film due to an extreme bending. The purity of the plated film is not significant, even if the Al or Ti film contains less than a few percent of impurities such as Mg, Cu, Fe, Si, Zn and Mn.

In Al plating or Ti plating, it is impossible to deposit electrolytically Al and Ti from aqueous solutions. The use of an electrolytical deposition of Al and Ti from a salt fused bath and an organic solution bath or of dry processes such as a vacuum evaporation and ion plating is preferred in plating Al and Ti on steel. The dry processes are suitable particularly for obtaining a plated film of high density and high corrosion resistance.

Further, high corrosion resistance of the outer surface and beauty of the can as well as printability are required for the material used for manufacturing a can. When a plated film is formed, the requirements for those features are satisfied by coating a metal such as Al, Ti, Zn, Ni, Co, Cr, Mo or Sn. Accordingly, the features required for the outer surface of the can be fulfilled sufficiently by applying a steel sheet which is coated with a film of a metal selected from the group of those metals to the outer surface of the can.

When the thickness of a plated coating on the outer surface of steel sheet as well as on the inner surface of steel sheet is thinner than 0.005 $\mu$m, the coverage of film is insufficient. A plated film of 5 $\mu$m in thickness is sufficient. An excessively thickened film gives rise to difficulties in working.

In plating the outer surface of steel sheet, metals such as Zn, Ni, Cr and Sn precipitate easily from aqueous solutions. Any plating methods can be used, but the dry processes as mentioned above are appropriate for obtaining a dense and uniform film of a beautiful external appearance.

In this preferred Embodiment, Ti plated film or Al plated film is formed on the steel surface corresponding to the inner surface of a can. The same results can be obtained when Ti alloy plated film or Al alloy plated film is formed. In the present invention, only the above-mentioned plated film is sufficiently effective. In addition, the above-mentioned metal coated steel sheets with chemical treatment are more effective for can use.

Phosphate treatment, chromate treatment, chromic acid phosphate treatment and the like are useful for from the above-mentioned chemical conversion treatments. The above-mentioned treatments are carried out by one selected from treatments of immersion, spraying and electrolysis. The thickness of chemical conversion film needs to be 0.01 to 0.1 $\mu$m.

In the present invention, the feature is that one surface of steel sheet is plated with a corrosion-resistant and harmless metal whose electrode potential is almost equal to that of aluminium. Therefore, even if the above-mentioned steel sheet is used in combination with aluminium, there is no possibility of occurrence of bi-metallic corrosion. Further, the present invention combines the easy handling of the steel sheet in can making and the use of easy-open end. This enables provision of a convenient can. Furthermore, the other surface of the steel sheet being the outer surface of the can is plated with a dense and uniform metal of high corrosion resistance. From the above-mentioned features, the present invention enables the plated steel sheet to be used widely as the material for a can and effectively contributes to the development of the food industry.

EXAMPLE

One surface of cold rolled steel sheet was plated with Al, Al alloy, Ti and Ti alloy. Surface treated steel sheet was made from the steel sheet, the other surface of which was plated with Ti, Cr, Al, Ni, Zn, Mo, Sn or Co. Bi-metallic corrosion tests on one surface (the inner surface of a can) of the surface treated steel sheet were run to examine the corrosion resistance and salt spray tests were run to examine the rust resistance of the other surface of the steel sheet.

0.5 KW, 20 mm in diameter, YAG laser beam was shot on cold rolled steel sheet of 0.21 mm in thickness for one second to clean the surface. Thereafter, the inner plated film and the outer plated film were formed on the steel sheet under the following conditions:

| | |
|---|---|
| Degree of vacuum | $6 \times 10^{-6}$ Torr |
| Temperature of base steel sheet | 200° C. |
| Method of evaporation | heating by electron beam |
| Distance between base steel sheet and crucible | 50 cm |
| Inner plated film | Al, Ti, Al-1% Mg, Ti-3% Al, Ti-3% Cr |
| Outer plated film | Ti, Cr, Al, Ni, Zn, Mo, Sn, and Co |

Bi-metallic corrosion tests were run in the following manner:

Plated steel sheet was coated with epoxy phenolic lacquer at a thickness of 50 mg/dm$^2$ and then baked. The plated steel sheet was coupled with aluminium sheet coated and baked in the same manner using a wire through an ampere meter. Both the steel test piece and the aluminium one were sealed with a tape to remain a fixed unsealed area. Those test pieces were immersed and processed (subjected to retorting) in an aqueous solution containing 0.3% NaCl at 125° C. for 60 minutes. Thereafter, the test pieces were immersed in another aqueous solution containing 0.3% NaCl which was kept at 80° C. Then, a coupling electric current flowing between the plated steel sheet and the aluminium sheet was measured.

Salt spray tests were run according to JIS Z 2371 and the estimation of the test results was presented with a spraying time during which rust could be found out on a half of the area of the steel sheet subjected to the tests.

For comparison, two sorts of steel sheets having a thin plated coating and tinplate conventionally used were prepared and subjected to the tests. The above-mentioned two sorts of steel sheets were prepared in the same manner as the Preferred Embodiment. The tinplate was plated electrolytically with the use of a sulfuric acid aqueous solution used usually to form a tin film of 0.4 μm in thickness and subjected to a chromate treatment after it had been subjected to a reflow treatment.

The results of the above-mentioned tests are shown in Table 1. Controls and a conventional example are shown in Table 2.

As clearly seen from Table 1, in the examples of No. 1 to No. 27, the coupling electric current is 0.04 μA or less and the rust resistance of the outer surface of the test piece was good. As clearly seen from Table 2, the couple current of the test pieces No. 28 and No. 29, both of which have a film of 0.001 μm in thickness, increases over 20 times as much as the one of the present invention. In the test piece No. 30 of conventional tinplate, the coupling electric current increases 50 times or more. In view of those facts, it is understood that the surface treated steel sheet of the present invention is the steel sheet which hardly produces bi-metallic corrosion in a can.

In addition, it is understood that the surface treated steel sheet of the present invention is the steel sheet having a good corrosion resistance on the outer surface of a can. In this example, the surface of cold rolled steel sheet was cleaned by means of the laser beam. Instead of the laser beam, however, cleaning methods such as solvent degreasing by means of trichloroethylene, electrolytic degreasing by means of sodium hydroxide and the like can be used.

TABLE 1

| | Test pieces Nos. | Inner plated film Plated-metal | Thickness (μm) | outer plated film Plated-metal | Thickness (μm) | Bi-metallic corrosion resistance Coupling current (μA) | Salt spraying time for treating rust resistance of outer surface of steel (hour) |
|---|---|---|---|---|---|---|---|
| Examples | 1 | Al | 0.1 | Ti | 0.3 | 0.01 | 120 |
| | 2 | Al | 0.1 | Cr | 0.3 | 0.02 | 75 |
| | 3 | Al | 0.1 | Al | 0.3 | 0.01 | 125 |
| | 4 | Al | 0.1 | Ni | 0.3 | 0.02 | 60 |
| | 5 | Al | 0.1 | Zn | 0.3 | 0.02 | 50 |
| | 6 | Al | 0.1 | Mo | 0.3 | 0.01 | 65 |
| | 7 | Al | 0.1 | Sn | 0.3 | 0.01 | 70 |
| | 8 | Al | 0.1 | Co | 0.3 | 0.01 | 95 |
| | 9 | Ti | 0.1 | Ti | 0.3 | 0.03 | 125 |
| | 10 | Ti | 0.1 | Al | 0.3 | 0.03 | 130 |
| | 11 | Al | 0.01 | Ti | 0.01 | 0.02 | 100 |
| | 12 | Al | 1.0 | Ti | 1.0 | 0.005 | 135 |
| | 13 | Al | 3.5 | Al | 0.01 | 0.004 | 110 |
| | 14 | Ti | 0.01 | Al | 1.0 | 0.04 | 200 |
| | 15 | Ti | 1.0 | Ni | 0.01 | 0.007 | 50 |
| | 16 | Ti | 3.5 | Ni | 1.0 | 0.005 | 85 |
| | 17 | Al | 0.01 | Cr | 0.01 | 0.02 | 45 |
| | 18 | Al | 0.01 | Cr | 1.0 | 0.02 | 70 |
| | 19 | Al | 1.0 | Zn | 0.01 | 0.006 | 30 |
| | 20 | Al | 1.0 | Zn | 1.0 | 0.005 | 80 |
| | 21 | Al | 0.01 | Mo | 0.01 | 0.02 | 45 |
| | 22 | Ti | 1.0 | Sn | 0.01 | 0.007 | 50 |
| | 23 | Ti | 1.0 | Sn | 1.0 | 0.006 | 120 |
| | 24 | Ti | 0.01 | Co | 0.01 | 0.02 | 45 |
| | 25 | Al — 1% Mg | 0.1 | Al | 1.0 | 0.02 | 120 |
| | 26 | Ti — 3% Al | 0.1 | Al | 0.3 | 0.03 | 135 |
| | 27 | Ti + 3% Cr | 0.15 | Ti | 0.3 | 0.02 | 130 |

TABLE 2

| | Test pieces Nos. | Inner plated film Plated-metal | Thickness (μm) | outer plated film Plated-metal | Thickness (μm) | Bi-metallic corrosion resistance Coupling current (μA) | Salt spraying time for treating rust resistance of outer surface of steel (hour) |
|---|---|---|---|---|---|---|---|
| Controls | 28 | Al | 0.001 | Ti | 0.004 | 0.55 | 25 |
| | 29 | Ti | 0.001 | Al | 0.004 | 0.70 | 30 |
| Conventional tinplate | 30 | Sn | 0.1 | Sn | 0.4 | 1.15 | 20 |

What is claimed is:

1. A method for producing a coated steel sheet for a can comprising:
    plating an Al film 0.005 to 5 μm thick on one surface of a steel sheet by means of a dry process; and plating a metal film 0.005 to 5 μm thick on the other surface of the steel sheet by means of a dry process, said plated metal film comprising a metal selected from the group consisting of Al, Zn, Ni, Co, Cr, Mo and Sn.

2. A method for producing a coated steel sheet for a can comprising:

plating an Al alloy film 0.005 to 5 μm thick on one surface of the steel sheet by means of a dry process; and plating a metal film 0.005 to 5 μm thick on the other surface of the steel sheet by means of a dry process, said plated metal film comprising a metal selected from the group consisting of Al, Ti, Zn, Ni, Co, Cr, Mo and Sn.

3. A method for producing a coated steel sheet for a can comprising:

plating a Ti film 0.005 to 5 μm thick on one surface of the steel sheet by means of a dry process; and plating a metal film 0.005 to 5 μm thick on the other surface of the steel sheet by means of a dry process, said plated metal film comprising a metal selected from the group consisting of Al, Ti, Zn, Ni, Co, Cr, Mo and Sn.

4. A method for producing a coated steel sheet for a can comprising:

plating a Ti alloy film 0.005 to 5 μm thick on one surface of the steel sheet by means of a dry process; and plating a metal film 0.005 to 5 μm thick on the other surface of the steel sheet by means of a dry process, said plated metal film comprising a metal selected from the group consisting of Al, Ti, Zn, Ni, Co, Cr, Mo and Sn.

* * * * *